Patented May 22, 1923.

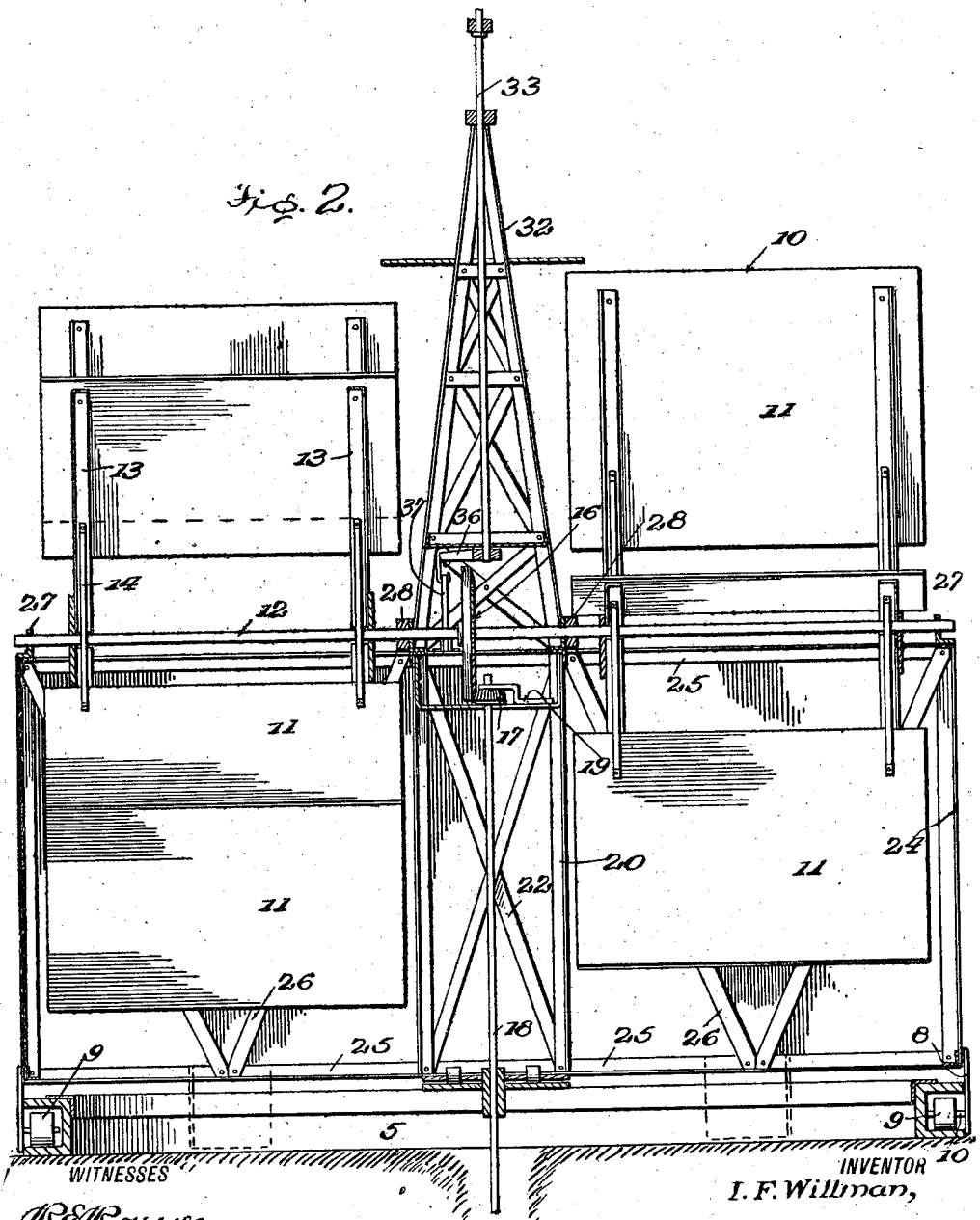

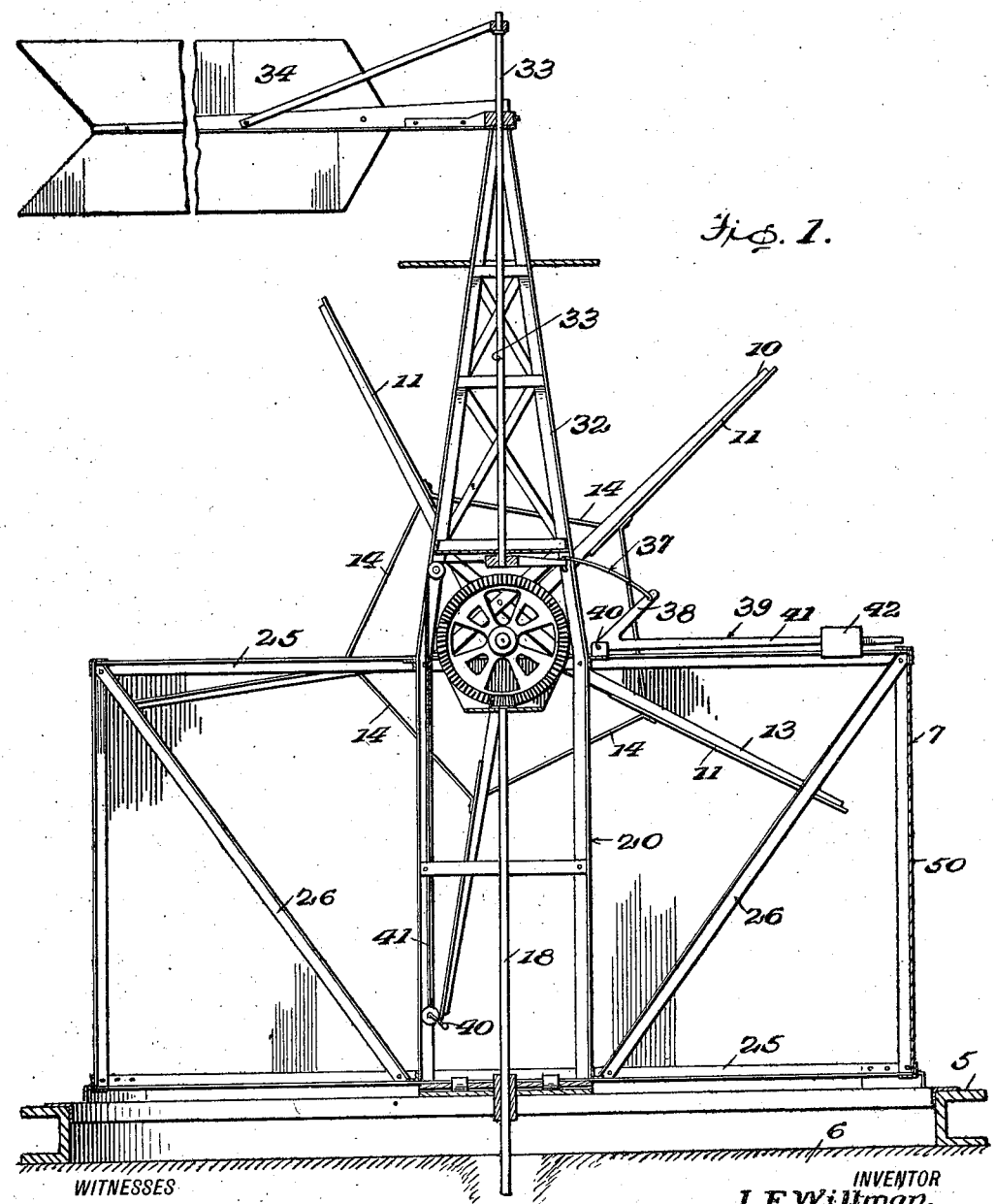

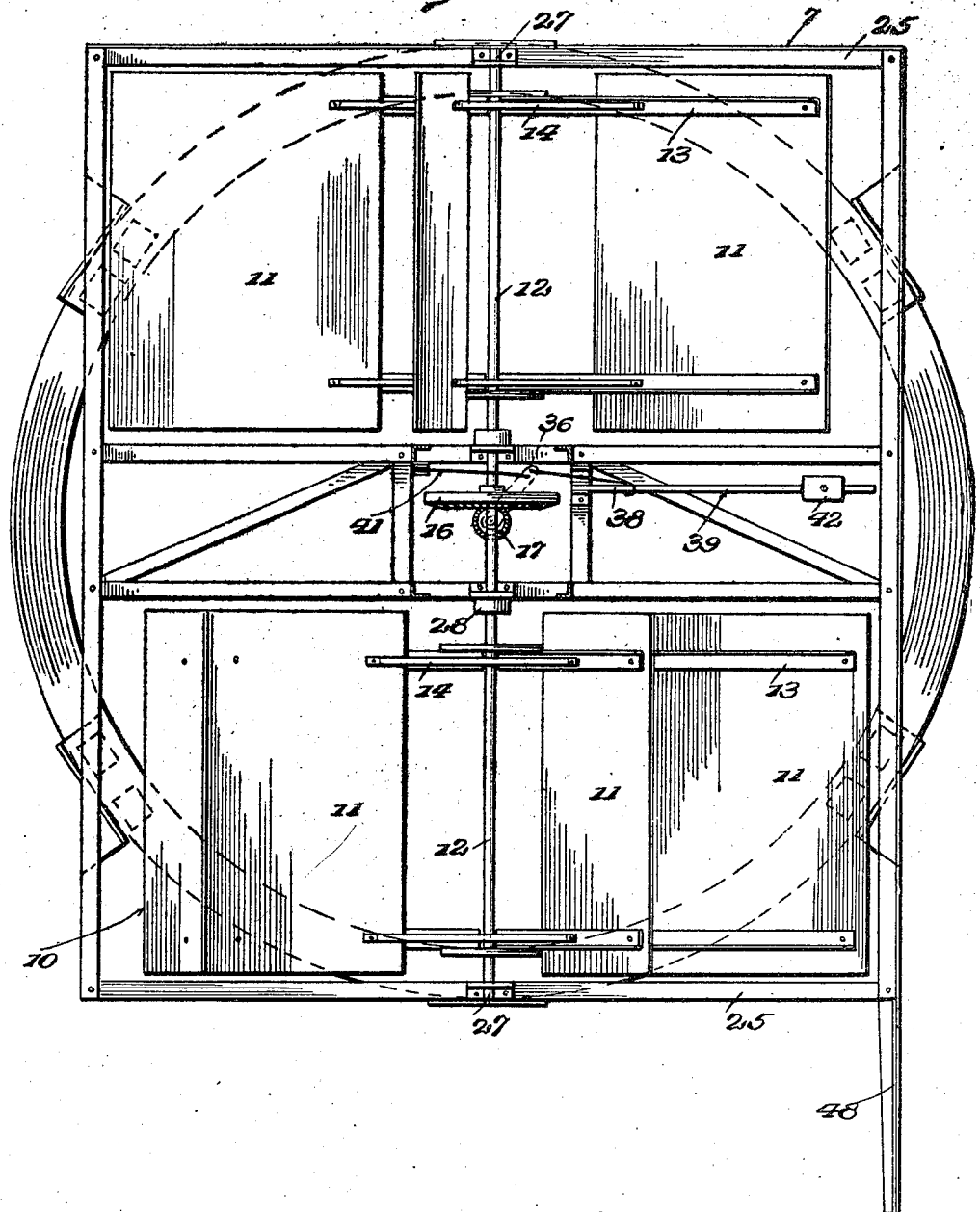

1,455,950

UNITED STATES PATENT OFFICE.

IRVIN F. WILLMAN, OF MULESHOE, TEXAS.

WINDMILL.

Application filed December 23, 1921. Serial No. 524,458.

*To all whom it may concern:*

Be it known that I, IRVIN F. WILLMAN, a citizen of the United States, and resident of Muleshoe, county of Bailey, and State of Texas, have invented certain new and useful Improvements in Windmills, of which the following is a specification.

This invention relates to windmills especially adapted for use in operating wells although not necessarily restricted to such use.

An important object of this invention is to provide a windmill having novel means whereby the same is positioned with relation to the wind and whereby the same may be thrown out of gear during a storm or high wind.

A further object of the invention is to provide a windmill having a pair of wooden or metal wheels which by a novel arrangement of parts are operatively connected to the pitman rod or drive shaft.

A further object of the invention is to provide a windmill of the class described which is simple to operate, of highly simplified construction and cheap to manufacture.

Other objects and advantages of the invention will be apparent during the course of the following description.

In the accompanying drawings,

Figure 1 is a vertical sectional view through the windmill.

Figure 2 is a similar view, the view being taken at right angles to Figure 1.

Figure 3 is a plan view of the improved windmill, the wind vane tower being shown in section.

In the drawing the numeral 5 generally designates a track which may be mounted upon a concrete foundation 6 or upon a suitable tower. It is understood, of course, that the track 5 may be mounted at any desired height so as to arrange the windmill in the path of the wind so as to insure operation.

A frame 7 is mounted upon the base 5 and is provided with depending bearing plates 8 or arms to which rollers or casters 9 are connected by means of pins 10. With reference to Figure 2 it will be observed that the base 5 is of channel-shaped formation and that the rollers or casters 9 are mounted upon the lower flanges of the base 5 while the upper flanges of the base 5 form a means to hold the frame 7 in position when subjected to a high wind. It is thus seen that the frame 7 may readily and conveniently rotate about the axis of the annular base member 7 so that the several wind wheels generally designated by the numeral 10 may readily adapt themselves to the wind.

The wind wheels 10 of which there are two consist of radially arranged blades 11, connected to a shaft 12 by means of radial spokes 13 which may be in the nature of angle bars. The spokes 13 are connected intermediate their ends by bracing rods 14. The intermediate portions of the shaft 12 is provided with a power transmitting gear wheel 15 which meshes with a pinion 17 on the upper end of a shaft 18. The upper end of the shaft 18 is rotatably extended through a bracket 19 carried by a framework 20. The framework 20 consists of a plurality of spaced standards and cross braces, the cross braces being designated by the numeral 22. The main frame 5 is also composed of a plurality of standards 24 preferably formed from angle iron and the standards are connected by cross bars 25 and suitable bracing devices 26 may be connected to the cross bars and to the standards.

As illustrated in Figures 2 and 3, the cross shaft 12 is rotatably mounted in bearings 27 and 28 mounted upon the frame 5 and the frame 20. If desired the shaft may be formed with a crank 30 to which a pitman rod 31 may be connected, the said pitman rod 31 being employed in lieu of the power transmitting shaft 18. By the employment of the crank 30 as illustrated in Figure 4 the pitman rod 30 will be caused to reciprocate instead of rotate as in the case of the shaft 18 illustrated in Figure 2.

A wind vane tower 32 is mounted upon the upper end of the main frame 7 and the inner frame 20 and is tapered toward its upper end in the manner illustrated in Figure 2. A control shaft 33 is rotatably extended through the wind vane tower 32 and has its upper portion provided with a vane 34 which swings with the wind and thereby controls the position of the main frame 7 and the wind wheels carried thereby. The lower portion of the shaft 33 is provided with a radially arranged arm 36 having its ends connected to a link 37 which in turn is connected to the angularly extended branch 38 of a crank generally designated by the numeral 39. The crank 39 is pivoted to the frame 7 as indicated at 40 and has a long branch 41 on which a weight 42 is adjustably mounted. The position of the weight 42 on the long branch 41 regulates the speed with which the lever arm 36 may move with relation to the vane tower 32. In other words when the weight 42 is positioned on the outer end of the long branch 41 the arm 36 will not readily move with relation to the tower but will cause the whole frame as a unit to rotate thereby adjusting the several wind wheels to the wind. In this manner the several wind wheels are maintained in the proper position with relation to the wind.

On the other hand if it is desired to throw the wind wheels out of gear or out of their opposed relation to the wind a windlass 40 may be operated for drawing on a cable 41 connected at its upper end to the arm 36 of the shaft 33. In this manner the windlass 40 may be operated for turning the vane 34 and thereby causing the several wind wheels to be thrown out of gear.

As illustrated in Figure 3 an adjustable vane 48 is extended from one side of the main frame 7 and forms a means whereby the several wind wheels may be thrown out of gear when desired.

With reference to the foregoing description taken in connection with the accompanying drawing it will be seen that a wind wheel constructed in accordance with this invention is practically automatic in its operation and requires but a minimum of attention on the part of the operator. Since the lowermost blades of the several wind wheels are curved by the coverings 50 the lower blades are not exposed to the wind. This provides for the operation of the wheel at times when the wind is very low.

The wind wheels which are arranged in spaced relation on opposite sides of the tower 32 will be thrown out of operation at any time by the operation of the windlass 40 which is connected in the manner described to the vane 34 mounted on the upper end of the vane tower.

Having thus described the invention what is claimed is:—

A windmill comprising a frame having a centrally arranged tower, a horizontal shaft rotatably carried by said frame, spaced wind wheels carried by said shaft, a vane arranged above the tower and having a control shaft extending through the tower, a crank pivoted to said frame and having a short upwardly and outwardly directed branch, and an approximately horizontal branch, a link connecting said arm and said short branch, a weight adjustable on said approximately horizontal branch to regulate the response of the frame to the movement of the vane, and means whereby to rotatably support the frame.

IRVIN F. WILLMAN.